United States Patent

Giovannetti

[11] Patent Number: 6,148,569
[45] Date of Patent: Nov. 21, 2000

[54] FASTENING DEVICE FOR JOINING TOGETHER FURNISHING PANELS

[76] Inventor: Fiorello Giovannetti, Residenza Alberata (MI 2), Segrate, Italy, 20090

[21] Appl. No.: 09/231,673

[22] Filed: Jan. 15, 1999

[30] Foreign Application Priority Data

Jan. 19, 1998 [IT] Italy .................................. MI98A0082

[51] Int. Cl.$^7$ ................................................... F16B 12/00
[52] U.S. Cl. ..................... 52/127.11; 52/127.7; 52/582.2; 403/231; 403/297; 403/408.1; 403/DIG. 10; 403/DIG. 12
[58] Field of Search ................................ 52/127.6, 127.7, 52/127.8, 127.9, 127.11, 582.2; 403/231, 408.1, DIG. 10, DIG. 12, DIG. 13, 297

[56] References Cited

U.S. PATENT DOCUMENTS

| | | | |
|---|---|---|---|
| 3,574,367 | 4/1971 | Jankowski | 403/DIG. 10 X |
| 3,811,785 | 5/1974 | Hagglund | 403/408.1 X |
| 4,131,376 | 12/1978 | Busse | 403/231 X |
| 4,345,849 | 8/1982 | Stenemann | 403/252 |
| 4,455,103 | 6/1984 | Hackenberg | 403/408.1 X |
| 4,572,694 | 2/1986 | Hoeksema | 403/DIG. 12 X |
| 4,664,548 | 5/1987 | Brinkmann . | |
| 4,693,630 | 9/1987 | Giovannetti . | |

FOREIGN PATENT DOCUMENTS

| | | |
|---|---|---|
| 2152941 | 4/1973 | France . |
| 25 46 526 | 4/1977 | Germany . |
| 26 23 814 | 12/1977 | Germany . |

*Primary Examiner*—Laura A. Callo
*Attorney, Agent, or Firm*—Jacobson, Price, Holman & Stern, PLLC

[57] ABSTRACT

A fastening device to join together panels comprises a body (12) that has a spreader (32); a U-shaped spring (14) with arms (47, 48) provided with outward facing gripping portions (47", 48") protruding from the body and drawn together in a resting position; a cam-type operating element (18) rotatable in the body. By rotating the cam element, the spring is movable between a resting position with the arms close to each other, in which it leaves the panels free and an engagement position with the arms spread apart, in which it engages the walls of a hole in a panel, and vice versa. The body (12) has an elongated cylindrical shape and comprises an internal housing (26). A slide element (16) is received inside the housing, is moveable for an axial distance along it, and has a housing (44) for engaging the spring. The cam element (18) is received in the body and in the slide to operate the movement of the slide between the resting position of the spring and the working position of the spring and vice versa.

7 Claims, 3 Drawing Sheets

FASTENING DEVICE FOR JOINING TOGETHER FURNISHING PANELS

DESCRIPTION

The invention refers to the field of joining devices for joining together panels of wardrobes, shelves or coverings in a releasable or not releasable way with respect to one another.

Italian patent No. 1169586 discloses a fastening device comprising a drum-shaped body suitable to be received in a cavity in a first one of the panels to be joined, at one side thereof, and a spring element having spreadable arms which are close to each other in an unstressed condition; said arms protruding from a side wall of the drum-shaped body to engage a corresponding hole in a second panel to be joined. The body has a spreading element positioned between the spring arms and rotatably receives an operating cam which, when rotated, moves the spring between an extended position wherein the arms are not stressed by the spreading element and a retracted condition in which the arms are forced apart by the spreading element and engage the side walls of a hole of the second panel.

Although this prior device has given an excellent performance, the fact that a face of the drum-shaped body is exposed on a surface of the first panel is considered aesthetically unacceptable for some uses. A trend in the field is toward increasingly improved devices that can be almost completely hidden from view and nevertheless have increasingly better strength.

The invention device, as defined in the claims, is aimed to the above objects.

Further characteristics of the invention device are said in the dependent claims.

In other words, a new fastening or clamping device comprises a tubular body to be at least partially received in a first panel and retained therein, being accessible only through control opening(s) in said first panel; a resilient or spring element with spreadable arms, received in said body, said spring element being U-shaped as a whole and the distal ends of the arms thereof forming gripping means; a slidable element received and slidable inside the body and engaging the connecting part of the U of the spring so as to pull said spring for a set stroke between a retracted or working position thereof and an extended or resting position thereof, and vice versa; said body having a stationary spreading device that engages the arms of the spring at least in the retracted position thereof and preferably having a protruding guard or cap element, the profile whereof circumscribes the profile of the spring arm ends in the resting position thereof. A cam is rotatably received inside the body and is accessible from the outside to operate the movement of the slide.

The new device can be made in a miniaturized form, supports high traction loads and transverse loads, and is particularly suited to the aesthetic requirements imposed on the furniture structure.

An unrestrictive exemplary embodiment of the fastening device will be described below with reference to the appended figures in which.

Figure 1:
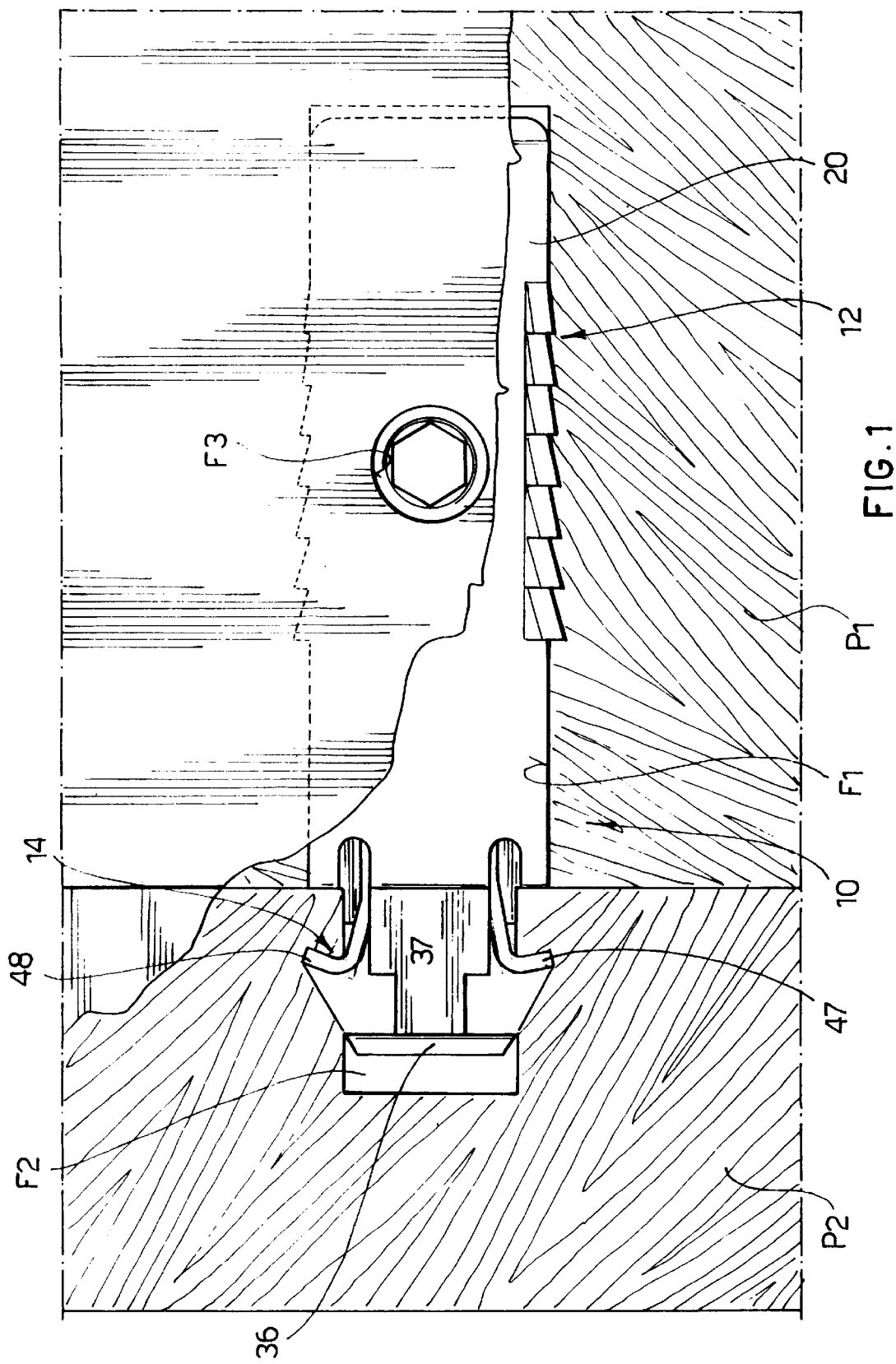
FIG. 1 is a part-sectional view through an assembly of two panels coupled by means of a device according to the invention; the device is shown in a locking or working position, with spring arms spread apart.

The new device is referenced 10 as a whole in the appended figures. It comprises a tubular body or shell 12, a spring or "beak" 14, a slide 16 received inside the body, and a cam element 18. The body or shell 12 comprises two half-shells, 20 and 22, respectively. Each half-shell comprises externally toothed surface portions, referenced 23 and 24 respectively, to grip the walls of a housing hole in a panel. Each half-shell also comprises a cylindrical housing 26 with a longitudinal axis, said housing receiving the slide, and being provided with transverse abutment walls, 27 and 28 respectively. Each half-shell further comprises a through hole 29 and 30, respectively, the two holes being aligned in the assembled half-shells, to rotatably receive a stem of the cam element 18. Each half-shell, or at least one of them, further comprises spreading means 32, including inclined walls, 32' respectively that extend in a stem 34 ending with a protective guard or cap 36. Each half-shell has an extending protective wall 37. The two half-shells further comprise coupling means, preferably male and female coupling means, on one half-shell and the other, generically referenced 38, 40. The slide 16 comprises two half-slides 16' and 16" coupled to each other by means of male and female means or in any other suitable way and having a projection with abutment surfaces 41, 42 for cooperation with the abutment walls 27, 28 of the half-shells. The slide also has a housing 44, which is U-shaped in plan view and receives a connecting part (the part joining the arms) of the spring 14. The slide further has a chamber 45 to receive and cooperate with the cam element 18.

The spring 14 is substantially U-shaped in plan view with the arms 47, 48 of the U provided with inclined portions 47', 48' in order to collaborate with the inclined walls 32' of the spreading means. The arms of the spring 14 have outward facing possibly toothed end parts, 47" and 48" respectively, forming gripping means to bite the walls of a hole in a panel to be assembled. Reference 49 is the spring part joining the arms. The cam element essentially comprises a drive shaft 50 rotatably received in aligned half-shell openings or holes 29 and 30 and in the chamber 45 of the slide and an eccentric part 52 that cooperates with the wall of the chamber 45. A generally hexagonal through hole 53 is provided for operation by means of a hexagonal or Allen wrench (not shown).

In use, two cylindrical holes are made in a first panel P1 and a second panel P2 (FIG. 2) respectively, i.e. a hole F1 in panel P1 and a hole F2 in panel P2; the holes are made in the panel surfaces, which are to be positioned one against the other. Operation or access holes F3 are then made with their axis at right angles to F1. A device 10 driven into hole F1 is retained therein by the half-shell fins or indentations 24 and 23 and is positioned so as to protrude with an end part that comprises the protective cap 36 and the protective walls 37. During this stage the spring is in the resting condition shown in FIGS. 2 and 4, that is to say with the arms brought together and the gripping means or claws received beneath or behind the protective cap 36. This allows the end of the device to enter the hole F2 without difficulty and without damaging the walls of the hole. Once the panel P2 has been positioned in the desired position with respect to the panel P1, a wrench (not shown) is introduced into the hole F3 until it engages the cam operating hole 53.

Figure 4:
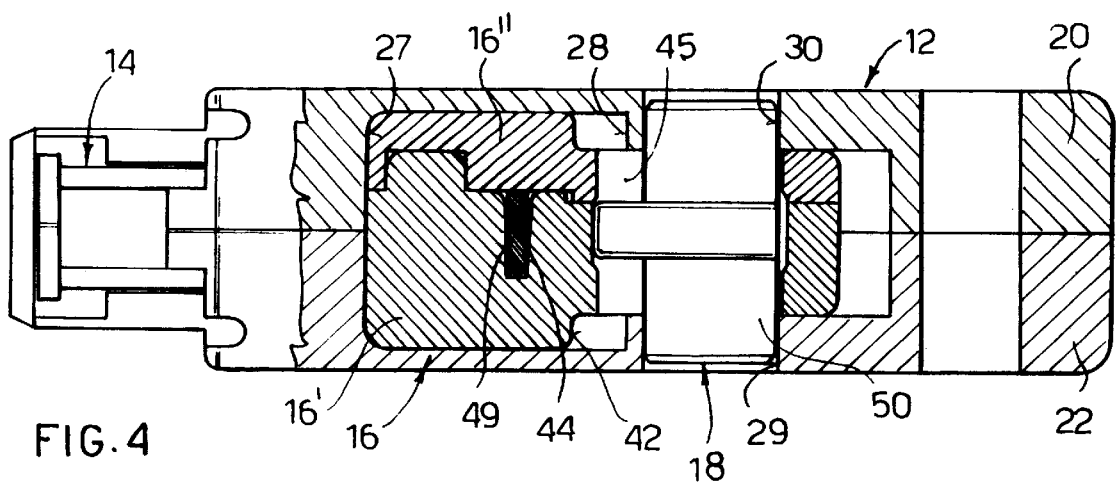
FIG. 4 is a part-sectional bottom plan view of the device, seen from below with respect to FIG. 2, and along a plane indicated by 4—4 in said figure.
Figure 5:
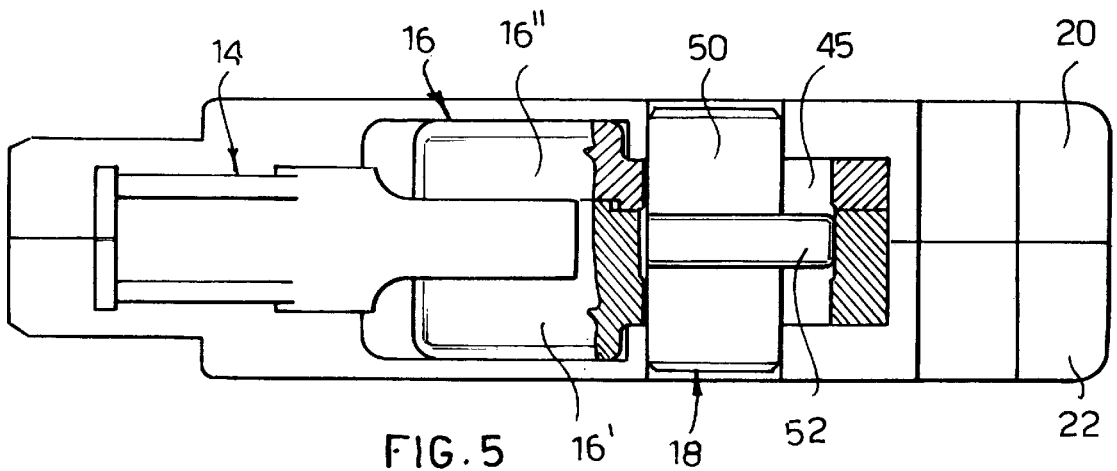
FIG. 5 is a view similar to FIG. 4 but shows the device in the working position corresponding to FIG. 3.
Figure 6:
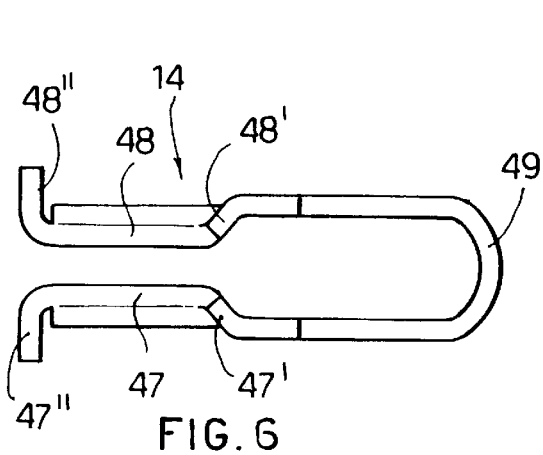
FIG. 6 is a top plan view of the U-shaped spring.
Figure 7:
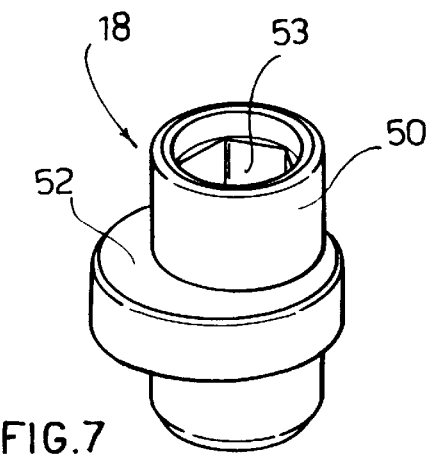
FIG. 7 is an isometric view of the cam element.

Rotation of the cam from the position shown in FIG. 4 to the position shown in FIG. 5 results in the slide 16 sliding from a position against abutment wall 42 to a position against abutment wall 28. This stroke of the slide draws with it the joining part of the spring and forces the spring arm inclined parts 46 to slide along the inclined walls of the spreading means, thus spreading apart the spring arms. This results in the end claws 47, 48 to spread apart outside the area covered by the protective cap 36 so as to engage the wall of the hole F2 as can be seen in FIG. 1.

Figure 2:
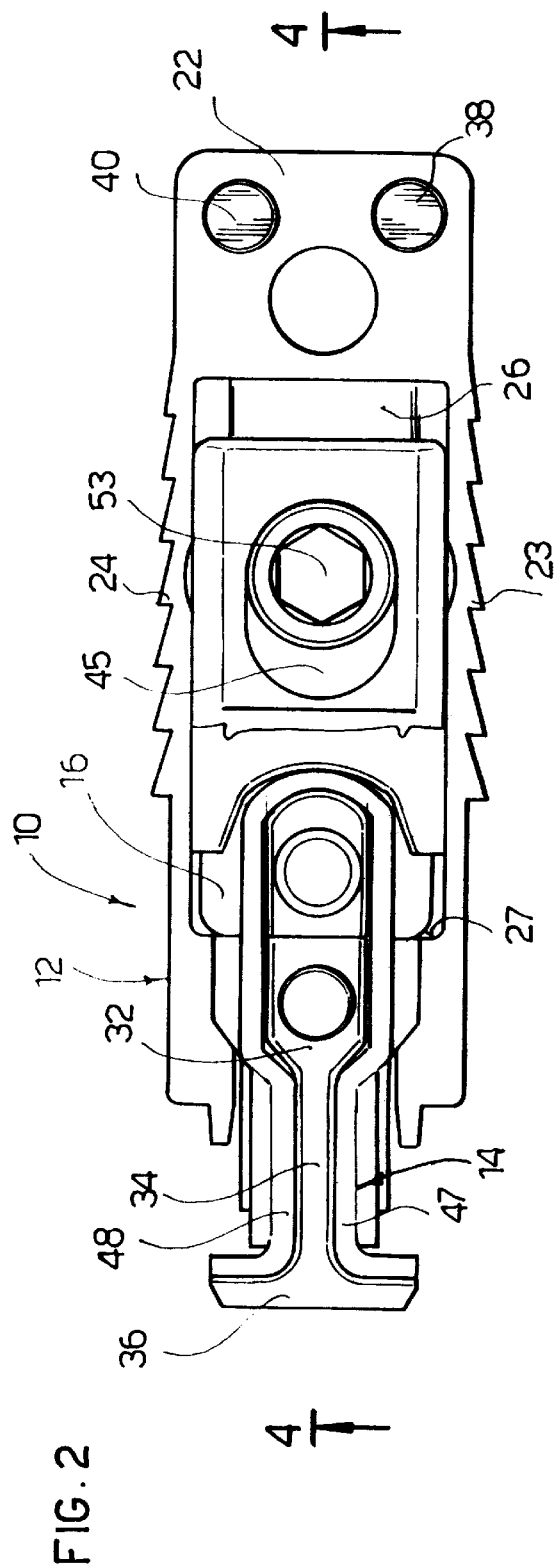
FIG. 2 is a side view of the device in a resting position, with a half-shell removed to show the inside.
Figure 3:
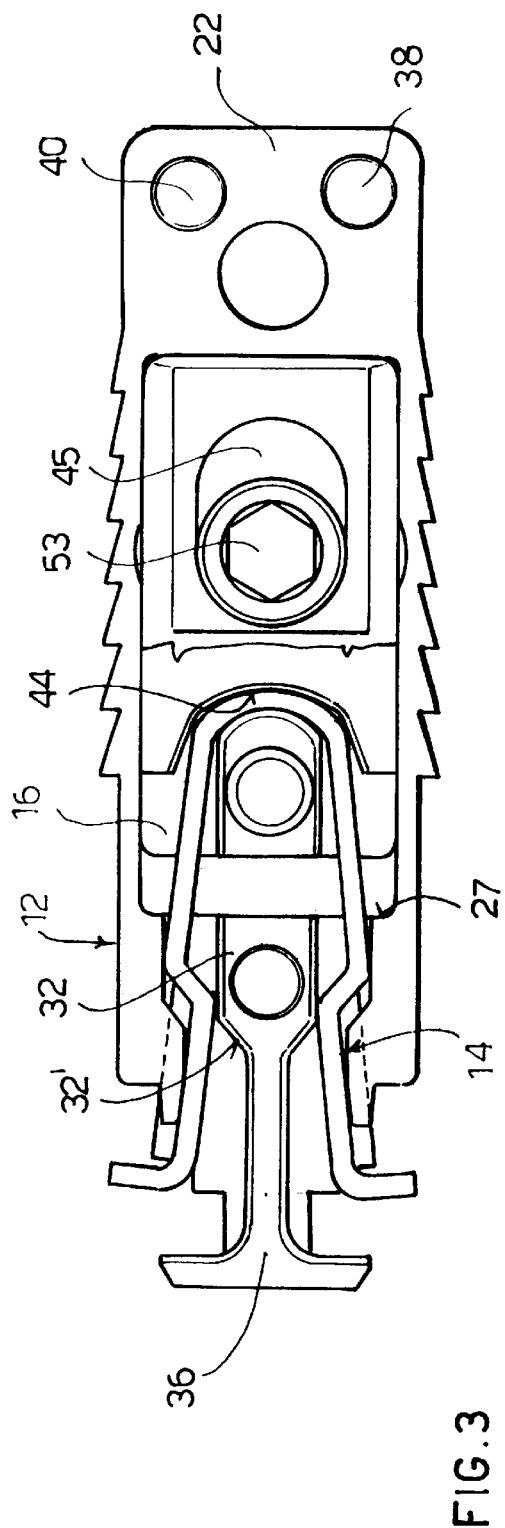
FIG. 3 is a side view similar to FIG. 2, but the device is shown in the working position, with the spring retracted and the spring arms spread apart.

The opposite cam operation, because of the elasticity of the spring which tends to resume its non-deformed state, brings together the branches of the spring, which thus returns to the position in FIG. 2 and allows the panels to be disassembled.

It should be noted that the hole 53 in the cam is preferably a through hole, so that said cam can be operated from one end or the other of the shaft 50, depending on which is preferable for assembly.

The new device can be inserted in panels to be coupled, with a minimal visual impact, since it is sufficient that hole F3 corresponding to cam operating hole 53 remains accessible from the outside on panel P1, whilst hole F2 for receiving the end of the device is absolutely invisible when the panels are assembled together.

Furthermore the new device has excellent strength in general, particularly shearing strength.

What is claimed is:

1. Fastening device to join together panels, comprising:
    a body (12) comprising spreading means (32); a U-shaped spring (14) having arms (47, 48) provided with outwardly facing gripping means (47", 48"), said arms protruding for a distance from said body, and being close together in a resting position;
    a cam element (18) rotatably received in said body; the whole being arranged so that upon rotation of the cam element, the spring is moved between a resting position with its arms close together, and an engagement or working position with the arms spread apart, and/or vice versa,
    characterized in that
        said body (12) has an elongated cylindrical shape and comprises a housing (26) on the inside;
        said device further comprising a slide element (16) received in said housing and axially movable for a distance along it, said slide element having means (44) for engaging said spring element,
        said cam element (18) being received in said body and in said slide element so as to operate the movement of said slide element between said resting position of the spring and said working position of the spring and vice versa.

2. A device according to claim 1, characterized in that the body comprises an end thereof comprising a protective cap part (36) of such a size as to substantially cover the gripping means (47", 48") of the spring in the resting position thereof.

3. A device according to claim 1, characterized in that said housing (26) in the body comprises opposite abutment walls (27, 28) for the slide element to define said working and resting positions of the spring.

4. A device according to claim 1, characterized in that the body is made of two half-shells (20, 22) engaged with each other.

5. A device according to claim 1, characterized in that the slide element (16) is made of two half-slides (16', 16") engaged with each other.

6. A device according to claim 1, characterized in that the cam element (18) has a shaft part (50) rotatably received in the body and in the slide element, and an eccentric part (52) extending from the shaft part and acting on the slide element.

7. A device according to claim 6, characterized in that the shaft part (50) of the cam element has an operating through-hole (53).

* * * * *